US007307974B2

United States Patent
Lee et al.

(10) Patent No.: US 7,307,974 B2
(45) Date of Patent: Dec. 11, 2007

(54) SYSTEM AND METHOD FOR CHANNEL ESTIMATION IN AN OFDM MOBILE COMMUNICATION SYSTEM

(75) Inventors: Jong-Hyeuk Lee, Yongin-si (KR); Yung-soo Kim, Seongnam-si (KR); Gi-Hong Im, Pohang-si (KR); Hui-Chul Won, Busan (KR); Cheol-Jin Park, Pohang-si (KR)

(73) Assignee: Samsung Electronics Co., Ltd. (KR)

( * ) Notice: Subject to any disclaimer, the term of this patent is extended or adjusted under 35 U.S.C. 154(b) by 593 days.

(21) Appl. No.: 10/840,584

(22) Filed: May 6, 2004

(65) Prior Publication Data
US 2005/0007983 A1 Jan. 13, 2005

(30) Foreign Application Priority Data
Jul. 8, 2003 (KR) ............ 10-2003-0046200

(51) Int. Cl.
*H04Q 7/00* (2006.01)
(52) U.S. Cl. .............. 370/334; 370/338; 370/335
(58) Field of Classification Search ........... 370/208, 370/203; 375/260; 455/101
See application file for complete search history.

(56) References Cited

U.S. PATENT DOCUMENTS

| | | | | |
|---|---|---|---|---|
| 2003/0072254 | A1* | 4/2003 | Ma et al. ............. | 370/208 |
| 2005/0147176 | A1* | 7/2005 | Yun et al. ............. | 375/260 |
| 2005/0233709 | A1* | 10/2005 | Gardner et al. ......... | 455/101 |

OTHER PUBLICATIONS

Weinstein et al., "Data Transmission by Frequency-Division Multiplexing Using the Discrete Fourier Transform", IEEE Transactions on Communication Technology, vol. COM-19, No. 5, Oct. 1971, pp. 628-634.
Alamouti, "A Simple Transmit Diversity Technique for Wireless Communications", IEEE Journal on Select Areas in Communications, vol. 16, No. 8, Oct. 1998, pp. 1451-1458.
Ahmed et al., "Asymptotic Performance of Transmit Diversity via OFDM for Multipath Channels", IEEE Globecom, Nov. 2002, pp. 1-5.

* cited by examiner

*Primary Examiner*—Jean Gelin
*Assistant Examiner*—Phuoc Doan
(74) *Attorney, Agent, or Firm*—The Farrell Law Firm

(57) ABSTRACT

A mobile communication system, a transmitter includes a first transmission antenna and a second transmission antenna, and the first and second transmission antennas transmit signals through at least one odd carrier and at least one even carrier. The transmitter determines a first symbol and a second symbol to be used for initial channel estimation of a receiver, encodes the first symbol and the second symbol by a preset transmit diversity scheme for a preset time, and transmits the encoded first and second symbols to the receiver through odd carriers and even carriers of the first transmission antenna and the second transmission antenna. The receiver receives a signal for the preset period, estimates channel frequency responses of odd carriers of the first transmission antenna and channel frequency responses of even carriers of the second transmission antenna, and estimates channel frequency responses of even carriers of the first transmission antenna and channel frequency responses of odd carriers of the second transmission antenna by using the estimated channel frequency responses.

30 Claims, 10 Drawing Sheets

|  | STC, SFC | | | | "INVENTION" | | | |
|---|---|---|---|---|---|---|---|---|
|  | CHANNEL ESTIMATION | | SYMBOL RESTORATION | | CHANNEL ESTIMATION | | SYMBOL RESTORATION | |
|  | TRAINING PERIOD | DATA PERIOD | | | TRAINING PERIOD | DATA PERIOD | | |
| COMPLEX MULTIPLICATION | 0 | 0 | 2N | | 0 | 0 | 5N | |
| REAL MULTIPLICATION | 0 | 0 | 2N | | 0 | 0 | 2N | |
| COMPLEX DIVISION | 0 | 0 | 0 | | 0 | 0 | 2N | |
| REAL DIVISION | 0 | 0 | 2N | | 0 | 0 | 0 | |
| REAL ADDITION | 6N | 6N | 3.5N | | 3N | 13N | 6.5N | |

FIG. 7

SYSTEM AND METHOD FOR CHANNEL ESTIMATION IN AN OFDM MOBILE COMMUNICATION SYSTEM

PRIORITY

This application claims priority under 35 U.S.C. § 119 to an application entitled "System and Method for Channel Estimation in an OFDM Mobile Communication System" filed in the Korean Intellectual Property Office on Jul. 8, 2003 and assigned Serial No. 2003-46200, the contents of which are incorporated herein by reference.

BACKGROUND OF THE INVENTION

1. Field of the Invention

The present invention relates generally to a mobile communication system using an orthogonal frequency division multiplexing (OFDM) scheme, and in particular, to a system and method for adaptively estimating a channel condition.

2. Description of the Related Art

An OFDM scheme, which has recently been developed for high-speed data transmission in a wire/wireless channel, transmits data using multiple carriers, and is a type of multi-carrier modulation (MCM) scheme for parallel-converting a serial input symbol stream and modulating the parallel-converted symbols with a plurality of subcarriers or subchannels before transmission. A system employing the MCM scheme was first applied to a military high-frequency (HF) radio set in the late 1950's, and the OFDM scheme that overlaps a plurality of orthogonal subcarriers has been developing since the 1970's. Due to the difficulty in realizing orthogonal modulation between multiple carriers, the OFDM scheme could be hardly applied to an actual system. However, as Weinstein et al. (See Weinstein, S. B. and Ebert, P. M., "Data Transmission by Frequency Division Multiplexing Using the Discrete Fourier Transform". IEEE Trans. Comm. Vol. COM-19 pp. 628-634, October 1971) announced in 1971 that OFDM modulation/demodulation could be efficiently performed using discrete Fourier transform (DFT), technologies related to the OFDM scheme have developed rapidly.

As a technique of using a guard interval and inserting a cyclic prefix guard interval becomes more widely used, a negative influence of the system on multipath phenomenon and delay spread has been reduced remarkably. Therefore, the OFDM scheme is being widely applied to digital transmission technologies such as digital audio broadcasting (DAB), digital television (DTV), wireless logical area network (WLAN), wireless asynchronous transfer mode (WATM), and fixed broadband wireless access (fixed BWA).

Currently, the OFDM scheme, which could not be widely used in the past due to its hardware complexity, can be realized with the recent development of various digital signal processing technologies including fast Fourier transform (FFT) and inverse fast Fourier transform (IFFT). The OFDM scheme, though similar to the conventional frequency division multiplexing (FDM) scheme, maintains orthogonality between multiple subcarriers while transmission, thereby securing optimal transmission efficiency during high-speed data transmission. In addition, the OFDM scheme has high frequency efficiency and is robust against multipath fading, thereby guaranteeing optimal transmission efficiency during high-speed data transmission. Moreover, because the OFDM scheme overlaps frequency spectrums, it has high frequency efficiency, is robust against frequency selective fading and multipath fading, can reduce inter-symbol interference (ISI) by using a guard interval, can simplify a hardware structure of an equalizer, and is robust against impulse noises. Therefore, the OFDM scheme tends to be popularly utilized in communication systems.

Although the above-stated OFDM scheme is robust against frequency selective fading, its performance is restrictive. A multi-antenna scheme is one of the improved schemes proposed to overcome the performance limitation. In general, however, a receiver supporting a radio data service has limitations on its size and power consumption. Therefore, it is not preferable to mount multiple antennas in the receiver. For these reasons, a transmit diversity scheme has been developed which mounts multiple transmission antennas in a transmitter having a more favorable environment, to thereby contribute to a reduction in complexity of the receiver and prevention of performance deterioration.

Among the many transmit diversity schemes developed up to the present, a space-time code (STC) scheme and a space-frequency code (SFC) scheme have a smaller number of calculations and a lower complexity. In addition, the OFDM scheme is a most appropriate communication scheme to which the SFC and STC schemes can be applied, and it can rapidly transmit a large amount of information while overcoming a multipath phenomenon and minimizing sacrifice of a frequency band. Thus, the OFDM scheme is universally used. Particularly, when using the STC and SFC schemes, the OFDM mobile communication system brings about performance improvement in terms of channel estimation. A description will now be made of a channel estimation operation when the STC scheme and the SFC scheme are used.

Before a description of the STC and SFC schemes, it will be assumed that in an OFDM mobile communication system, a transmitter uses two transmission antennas of a first transmission antenna Tx.ANT1 and a second transmission antenna Tx.ANT2, and a receiver uses one reception antenna Rx.ANT. An OFDM signal r[l,k] received through a $k^{th}$ subcarrier in an $1^{th}$ symbol period is DFT-transformed as follows in Equation (1):

$$r[l, k] = \sum_{i=0}^{1} h_i[l, k]x_i[l, k] + n[l, k], k = 0, 1, \ldots, N-1 \quad (1)$$

In Equation (1), N denotes the number of subcarriers in the OFDM mobile communication system, $h_i[l,k]$ denotes a channel frequency response of a $k^{th}$ subcarrier in an $1^{th}$ symbol period, $x_i[l,k]$ denotes a transmission symbol transmitted via an $i^{th}$ transmission antenna Tx.ANTi, and n[l,k] denotes a noise.

FIG. 1 schematically illustrates a conventional STC structure. Before a description of FIG. 1, it should be noted that the STC scheme is disclosed in a reference entitled "A Simple Transmit Diversity Technique For Wireless Communications," proposed by S. Alamouti (see IEEE J.Select. Areas Commun., vol.16, no. 8, 1451-1458, October 1998). In addition, it will be assumed in FIG. 1 that in a transmitter, signals are transmitted via two transmission antennas of a first transmission antenna Tx.ANT1 and a second transmission antenna Tx.ANT2. Referring to FIG. 1, when a symbol $s_0s_1$ is applied to an STC encoder (not shown), the STC encoder encodes the input symbol $s_0s_1$ by the STC scheme, and generates output symbols $(s_0,s_1)$ and $(-s_1^*, s_0^*)$ as shown in Table 1 below.

TABLE 1

| | Tx.ANT1 | Tx.ANT2 |
|---|---|---|
| t | $s_0$ | $s_1$ |
| t + T | $-s_1^*$ | $s_0^*$ |

In Table 1, t denotes a particular time, and t+T denotes a time when a time T has elapsed from the particular time t. That is, at the particular time t ($1^{th}$ symbol period), $s_0$ is transmitted via the first transmission antenna Tx.ANT1 and $s_1$ is transmitted via the second transmission antenna Tx.ANT2, and at the time t+T (($l+1)^{th}$ symbol period), $-s_1^*$ is transmitted via the first transmission antenna Tx.ANT1 and $s_0^*$ is transmitted via the second transmission antenna Tx.ANT2.

Signals transmitted via the first transmission antenna Tx.ANT1 and the second transmission antenna Tx.ANT2 experience a radio channel environment. In the reference entitled "A Simple Transmit Diversity Technique For Wireless Communications" proposed by S. Alamouti, channel estimation is performed on the assumption that a channel frequency response between two consecutive symbols remains unchanged. That is, because the constancy of channel frequency response between two consecutive symbols represents identity of the channel frequency response, a relation between the channel frequency responses is expressed in Equation (2) as:

$$h_i[k] = h_i[l,k] = h_i[l+1,k], i=0,1, k=0,1,\ldots,N-1 \quad (2)$$

Thus, data symbols in a data period, estimated by channel information, are expressed in Equation (3) as:

$$s_0 = \frac{h_0^* r_0 + h_1 r_1^*}{|h_0|^2 + |h_1|^2} \quad (3)$$

$$s_1 = \frac{h_1^* r_0 - h_0 r_1^*}{|h_0|^2 + |h_1|^2}$$

In Equation (3), $r_0 \equiv r[l,k]$, $r_1 \equiv r[l+1,k]$, $h_0 \equiv h_0[k]$, $h_1 \equiv h_1[k]$.

In addition, channel estimation results obtained using previously known training symbols or decoded data symbols in a transmission/reception period are expressed in Equation (4) as:

$$h_0 = \frac{r_0 s_0^* - r_1 s_1}{2} \quad (4)$$

$$h_1 = \frac{r_0 s_1^* + r_1 s_0}{2}$$

In Equation (4), it is assumed that signal power is normalized to 1.

FIG. 2 schematically illustrates a conventional SFC structure. Before a description of FIG. 2, it should be noted that the SFC scheme is disclosed in a reference entitled "Asymptotic Performance Of Transmit Diversity Via OFDM For Multipath Channels," proposed by N. Ahmed and R. Baraniuk (see IEEE Globecom, 2002). In addition, it will be assumed in FIG. 2 that in a transmitter, signals are transmitted via two transmission antennas of a first transmission antenna Tx.ANT1 and a second transmission antenna Tx.ANT2. Referring to FIG. 2, when a symbol $s_0 s_1$ is applied to an SFC encoder (not shown), the SFC encoder encodes the input symbol $s_0 s_1$ by the SFC scheme, and generates output symbols $(s_0, s_1)$ and $(-_1^*, s_0^*)$ as shown in Table 2 below.

TABLE 2

| | Tx.ANT1 | Tx.ANT2 |
|---|---|---|
| $f_1$ | $s_0$ | $s_1$ |
| $f_2$ | $-s_1^*$ | $s_0^*$ |

In Table 2, $f_1$ denotes a particular subcarrier, and $f_2$ denotes another subcarrier different from the $f_1$. That is, in the same period, for example, in an $1^{th}$ symbol period, at the subcarrier $f_1$, $s_0$ is transmitted via the first transmission antenna Tx.ANT1 and $s_1$ is transmitted via the second transmission antenna Tx.ANT2, and at the subcarrier $f_2$, $-s_1^*$ is transmitted via the first transmission antenna Tx.ANT1 and $s_0^*$ is transmitted via the second transmission antenna Tx.ANT2.

Signals transmitted via the first transmission antenna Tx.ANT1 and the second transmission antenna Tx.ANT2 experience a radio channel environment. In the reference entitled "Asymptotic Performance Of Transmit Diversity Via OFDM For Multipath Channels," proposed by N. Ahmed and R. Baraniuk, channel estimation is performed on the assumption that a channel frequency response between two consecutive subcarriers remains unchanged. That is, because the constancy of channel frequency response between two neighboring subcarriers represents identity of the channel frequency response, a relation between the channel frequency responses is expressed in Equation (5) as:

$$h_i[m] \equiv h_i[1, 2m] = h_i[1, 2m+1], i = 0, 1, m = 0, 1, \ldots, \frac{N}{2} - 1 \quad (5)$$

Thus, from Equation (1) and Equation (5), reception signals of two neighboring subcarriers in an $1^{th}$ symbol period are expressed in Equation (6) as:

$$r_0 = h_0 s_0 + h_1 s_1 + n_0$$

$$r_1 = -h_0 s_1^* + h_1 s_0^* + n_1 \quad (6)$$

In Equation (6), $r_0 \cong r[1,2m]$, $r_1 \cong r[1,2m+1]$, $h_0 \cong h_0[m]$, $h_1 \cong h_1[m]$, $n_0 \cong [1,2m]$, $n_1 \cong n[1,2m+1]$. In addition, from Equation (6), the results given in Equation (7) below can be obtained.

$$s_0 = \frac{h_0^* r_0 + h_1 r_1^*}{|h_0|^2 + |h_1|^2} \quad (7)$$

$$s_1 = \frac{h_1^* r_0 - h_0 r_1^*}{|h_0|^2 + |h_1|^2}$$

$$h_0 = \frac{r_0 s_0^* - r_1 s_1}{2}$$

$$h_1 = \frac{r_0 s_1^* + r_1 s_0}{2}$$

As described in conjunction with FIGS. 1 and 2, the STC channel estimation (or channel estimation by the STC scheme) performed on the assumption that a channel frequency response between two consecutive symbols remains unchanged as disclosed in the reference entitled "A Simple Transmit Diversity Technique For Wireless Communications" proposed by S. Alamouti, and the SFC channel estimation (or channel estimation by the SFC scheme) performed on the assumption that a channel frequency response between two consecutive subcarriers remains unchanged as disclosed in the reference entitled "Asymptotic Performance Of Transmit Diversity Via OFDM For Multipath Channels" proposed by N. Ahmed and R. Baraniuk, are identical in terms of performance in a channel environment where a channel frequency response between two consecutive symbols remains unchanged and a channel frequency response between two consecutive subcarriers remains unchanged.

However, the channel environment where a channel frequency response between two consecutive symbols remains unchanged and a channel frequency response between two consecutive subcarriers remains unchanged is an ideal channel environment, and in an actual mobile communication channel environment, a channel frequency response between two consecutive symbols and a channel frequency response between two consecutive subcarriers are changed due to movement of a user and a fading phenomenon. When a channel frequency response between two consecutive symbols is changed, performance of the STC channel estimation proposed by S. Alamouti cannot be guaranteed. Further, when a channel frequency response between two consecutive subcarriers is changed, performance of the SFC channel estimation proposed by N. Ahmed and R. Baraniuk cannot be guaranteed. Accordingly, there is a demand for a new channel estimation scheme suitable to an actual channel environment where a channel frequency response between two consecutive symbols and a channel frequency response between two consecutive subcarriers are changed.

SUMMARY OF THE INVENTION

It is, therefore, an object of the present invention to provide a channel estimation system and method adaptive to a channel environment in a mobile communication system.

It is another object of the present invention to provide a system and method for estimating a channel considering channel variation between subcarriers in a mobile communication system.

In accordance with a first aspect of the present invention, there is provided a system for estimating a channel in a mobile communication system in which a transmitter includes a first transmission antenna and a second transmission antenna, the first and second transmission antennas transmitting signals through at least-one odd carrier and at least one even carrier. The system comprises: the transmitter for determining a first symbol and a second symbol to be used for initial channel estimation of a receiver, encoding the first symbol and the second symbol by a preset transmit diversity scheme for a preset time, and transmitting the encoded first and second symbols to the receiver through odd carriers and even carriers of the first transmission antenna and the second transmission antenna; and the receiver for receiving a signal for the preset period, estimating channel frequency responses of odd carriers of the first transmission antenna and channel frequency responses of even carriers of the second transmission antenna, and estimating channel frequency responses of even carriers of the first transmission antenna and channel frequency responses of odd carriers of the second transmission antenna by using the estimated channel frequency responses.

In accordance with a second aspect of the present invention, there is provided a system for estimating a channel by a receiver in a mobile communication system in which a transmitter includes a first transmission antenna and a second transmission antenna, the first and second transmission antennas transmitting signals through at least one odd carrier and at least one even carriers. The system comprises: the transmitter for encoding symbols received for a preset reception period by a preset transmit diversity scheme, and transmitting the encoded symbols to the receiver through odd carriers and even carriers of the first transmission antenna and the second transmission antenna; and the receiver for receiving a signal for the preset reception period, restoring the received signal into transmission symbols by decoding the received signal according to a transmit diversity scheme applied in the transmitter, estimating channel frequency responses of odd carriers of the first transmission antenna and channel frequency responses of odd carriers of the second transmission antennas by using channel variations between channel frequency responses of odd carriers of the first transmission antenna and channel frequency responses of even carriers of the first transmission antenna and channel variations between channel frequency responses of even carriers of the second transmission antenna and channel frequency responses of odd carriers of the second transmission antenna, the channel frequency responses being detected from the restored transmission symbols in a previous reception period of the preset reception period, and estimating channel frequency responses of even carriers of the first transmission antenna and channel frequency responses of even carriers of the second transmission antennas by using channel frequency responses of odd carriers of the first transmission antenna and channel frequency responses of odd carriers of the second transmission antenna.

In accordance with a third aspect of the present invention, there is provided a method for estimating a channel in a mobile communication system in which a transmitter includes a first transmission antenna and a second transmission antenna, the first and second transmission antennas transmitting signals through at least one odd subcarrier and at least one even subcarrier, respectively. The method comprises the steps of: generating by the transmitter a first symbol and a second symbol to be used for initial channel estimation of a receiver; encoding by the transmitter the first symbol and the second symbol by a preset transmit diversity scheme for a preset period, and transmitting the encoded first and second symbols to the receiver through odd carriers and even carriers of each of the first and second transmission antennas; receiving by the receiver a signal for the preset period, and calculating channel frequency responses of odd carriers of the first transmission antenna and channel frequency responses of even carriers of the second transmission antenna; and estimating by the receiver channel frequency responses of even carriers of the first transmission antenna and channel frequency responses of odd carriers of the second transmission antenna by using the calculated channel frequency responses.

In accordance with a fourth aspect of the present invention, there is provided a method for estimating a channel by a receiver in a mobile communication system in which a transmitter includes a first transmission antenna and a second transmission antenna, the first and second transmission antennas transmitting signals through at least one odd carrier and at least one even carriers. The method comprises the steps of: receiving a signal for a preset reception period, and restoring the received signal into transmission symbols by decoding the received signal according to a transmit diversity scheme applied in the transmitter; estimating channel frequency responses of odd carriers of the first transmission antenna and channel frequency responses of odd carriers of the second transmission antennas by using channel variations between channel frequency responses of odd carriers of the first transmission antenna and channel frequency responses of even carriers of the first transmission antenna and channel variations between channel frequency responses of even carriers of the second transmission antenna and channel frequency responses of odd carriers of the second transmission antenna, the channel frequency responses being detected from the restored transmission symbols in a previous reception period of the preset reception period; and estimating channel frequency responses of even carriers of the first transmission antenna and channel frequency responses of even carriers of the second transmission antennas by using channel frequency responses of odd carriers of the first transmission antenna and channel frequency responses of odd carriers of the second transmission antenna.

BRIEF DESCRIPTION OF THE DRAWINGS

The above and other objects, features, and advantages of the present invention will become more apparent from the following detailed description when taken in conjunction with the accompanying drawings in which:

FIG. 7 is a table illustrating a comparison of the number of calculations between a channel estimation method proposed by S. Alamouti, a channel estimation method proposed by N. Ahmed and R. Baraniuk, and a channel estimation method proposed in the invention;

DETAILED DESCRIPTION OF THE PREFERRED EMBODIMENT

Figure 1:
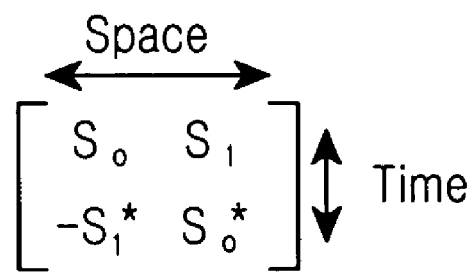
FIG. 1 schematically illustrates a conventional STC structure.
Figure 2:
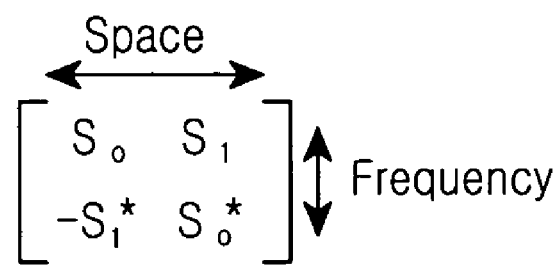
FIG. 2 schematically illustrates a conventional SFC structure.

Preferred embodiments of the present invention will now be described in detail herein below with reference to the annexed drawings. In the following description, a detailed description of known functions and configurations incorporated herein has been omitted for conciseness.

The present invention provides a channel estimation system and method adaptive to a channel environment in a mobile communication system employing an OFDM scheme (i.e., an OFDM mobile communication system).

As indicated above, the OFDM scheme is robust against frequency selective fading, but its performance is restrictive. A multiantenna scheme is one of the improved schemes proposed to overcome the performance limitation. In particular, attention is paid to a transmit diversity scheme capable of preventing performance degradation due to a fading phenomenon while reducing complexity of a receiver. Among many transmit diversity schemes developed up to the present, a space-time code (STC) scheme and a space-frequency code (SFC) scheme have a smaller number of calculations and a lower complexity. In addition, the OFDM scheme is a most appropriate communication scheme to which the SFC and STC schemes can be applied, and it can rapidly transmit a large amount of information while overcoming a multipath phenomenon and minimizing sacrifice of a frequency band. Particularly, when using the STC and SFC schemes, the OFDM mobile communication system brings about performance improvement in terms of channel estimation. The STC scheme, as described in the prior art section, performs channel estimation on the assumption that a channel frequency response between two consecutive symbols is constant as disclosed in the reference entitled "A Simple Transmit Diversity Technique For Wireless Communications," proposed by S. Alamouti (see IEEE J. Select. Areas Commun., vol. 16, no. 8, 1451-1458, October 1998). Unlike this, the SFC scheme, as described in the prior art section, performs channel estimation on the assumption that a channel frequency response between two consecutive subcarriers or subchannels remains unchanged as disclosed in the reference entitled "Asymptotic Performance Of Transmit Diversity Via OFDM For Multipath Channels," proposed by N. Ahmed and R. Baraniuk (see IEEE Globecom, 2002).

However, in an actual channel environment, a channel frequency response between two consecutive symbols and a channel frequency response between two consecutive subcarriers are changed due to movement of a user and a fading phenomenon. When a channel frequency response between two consecutive symbols is changed, performance of the STC channel estimation proposed by S. Alamouti is reduced. Further, when a channel frequency response between two consecutive subcarriers is changed, performance of the SFC channel estimation proposed by N. Ahmed and R. Baraniuk is lowered. Therefore, in order to obtain stable performance in an actual channel environment, a method of considering a variation in a channel frequency response between two consecutive symbols must be developed for the STC scheme, and a method of considering a variation in a channel frequency response between two consecutive subcarriers must be developed for the SFC scheme.

Therefore, the present invention proposes a channel estimation scheme adaptive to an actual channel environment where a channel frequency response between two consecutive symbols and a channel frequency response between two consecutive subcarriers are changed. Particularly, the present invention provides a scheme for estimating a channel considering a change in a channel frequency response between two consecutive subcarriers while applying the SFC scheme. A channel estimation scheme according to the present invention will now be described with reference to the accompanying drawings.

Figure 3:
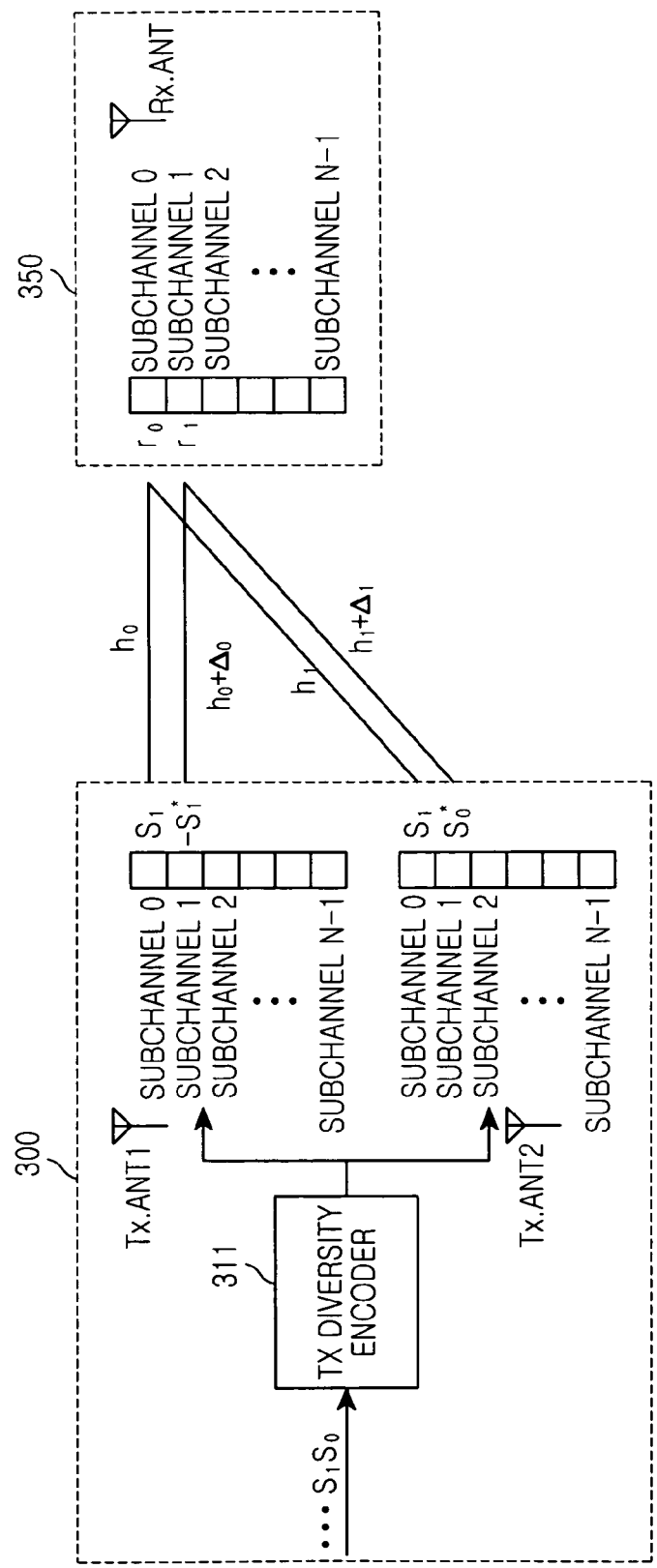
FIG. 3 schematically illustrates a structure of an OFDM mobile communication system according to an embodiment of the present invention.

FIG. 3 schematically illustrates a structure of an OFDM mobile communication system according to an embodiment of the present invention. Referring to FIG. 3, the OFDM mobile communication system comprises a transmitter 300 and a receiver 350, and it is assumed that the transmitter 300 includes, for example, two transmission antennas of a first transmission antenna Tx.ANT1 and a second transmission antenna Tx.ANT2. However, it should be noted that the transmitter 300 may include two or more transmission antennas, but the present invention will be described with two transmission antennas for ease of explanation. In addition, it is assumed that the receiver 350 includes one reception antenna Rx.ANT. Again, the receiver 350 could also include a plurality of reception antennas. Moreover, in describing the transmitter 300 and the receiver 350, an operation other than a transmit diversity operation is not directly related to the invention, so a detailed description thereof will be omitted for simplicity.

When transmission data symbols are received, a transmit diversity encoder 311 encodes the received data symbols by a preset transmit diversity scheme, and transmits the encoded data symbols via the first transmission antenna Tx.ANT1 and the second transmission antenna Tx.ANT2. Herein, it is assumed that the transmit diversity encoder 311 performs an encoding operation by the SFC scheme. When a symbol $s_0 s_1$ is applied to the transmit diversity encoder 311 as illustrated in FIG. 3, the transmit diversity encoder 311 encodes the input symbol $s_0 s_1$ by the SFC scheme and then generates output symbols $(s_0, s_1)$ and $(-s_1^*, s_0^*)$ as shown in Table 3 below.

TABLE 3

|       | Tx.ANT1   | Tx.ANT2   |
|-------|-----------|-----------|
| $f_1$ | $s_0$     | $s_1$     |
| $f_2$ | $-s_1^*$  | $s_0^*$   |

In Table 3, $f_1$ denotes a particular subcarrier, and $f_2$ denotes another subcarrier different from the $f_1$. That is, in the same period, for example, in an $1^{th}$ symbol period, at the subcarrier $f_1$, $s_0$ is transmitted via the first transmission antenna Tx.ANT1 and $s_1$ is transmitted via the second transmission antenna Tx.ANT2, and at the subcarrier $f_2$, $-s_1^*$ is transmitted via the first transmission antenna Tx.ANT1 and $s_0^*$ is transmitted via the second transmission antenna Tx.ANT2.

Signals transmitted via the first transmission antenna Tx.ANT1 and the second transmission antenna Tx.ANT2 experience a radio channel environment. In the invention, it is assumed that a channel frequency response between two consecutive subcarriers is changed, i.e., a channel frequency response between two neighboring subcarriers is changed. Thus, a relation between the channel frequency responses is expressed in Equation (8) as:

$$h_i[1, 2m+1] = h_i[1, 2m] + \Delta_{i,l}[1], i = 0, 1, m = 0, 1, \ldots, \frac{N}{2} - 1 \quad (8)$$

In Equation (8), N denotes the number of subcarriers in the OFDM mobile communication system, $h_i[1,2m+1]$ denotes a channel frequency response of a $(2m+1)^{th}$ subcarrier (or even subcarrier) in an $1^{th}$ symbol period between an $i^{th}$ transmission antenna Tx.ANTi and a reception antenna, and $h_i[1,2m]$ denotes a channel frequency response of a $2m^{th}$ subcarrier (or odd subcarrier) in the $1^{th}$ symbol period between the $i^{th}$ transmission antenna Tx.ANTi and the reception antenna.

From Equation (1) and Equation (8), reception signals of two neighboring subcarriers in an $1^{th}$ symbol period are expressed as given in Equation (9) below. Here, Equation (1) represents DFT results of an OFDM signal r[l,k] received through a $k^{th}$ subcarrier in an $1^{th}$ symbol period, and the DFT results become $$r[1, k] = \sum_{i=0}^{1} h_i[1, k] x_i[1, k] + n[1, k], k = 0, 1, \ldots, N - 1$$

(where $x_i[l,k]$ denotes a transmission symbol transmitted via an $i^{th}$ transmission antenna Tx.ANTi, and n[l,k] denotes a noise).

$$r_0 = h_0 s_0 + h_1 s_1 + n_0$$
$$r_1 = -(h_0 + \Delta_0) s_1^* + (h_1 + \Delta_1) s_0^* + n_1 \quad (9)$$

In Equation (9), $h_0 \equiv h_0[1,2m], h_1 \equiv h_1[1,2m], \Delta_0 \equiv \Delta_{0,m}[1], \Delta_1 \equiv \Delta_{1,m}[1]$. From Equation (9), the results given in Equation (10) below can be obtained.

$$h_0 = \frac{r_0 s_0^* - r_1 s_1}{2} + \frac{-\Delta_0 + \Delta_1 s_0^* s_1}{2} \quad (10)$$
$$h_1 = \frac{r_0 s_0^* + r_1 s_1}{2} + \frac{\Delta_0 + s_0^* s_1 - \Delta_1}{2}$$

In Equation (10), the number of equations is 2, whereas the number of parameters is 4, i.e., there are 4 parameters of $h_0$, $h_1$, $\Delta_0$, and $\Delta_1$. Thus, it is impossible to calculate the parameter values. However, for channel estimation, it is necessary to calculate values of the 4 parameters $h_0$, $h_1$, $\Delta_0$, and $\Delta 1$. Therefore, the present invention provides a method for estimating a channel in a training period and a data period in accordance with Equation (10). The training period and the data period will now be described with reference to FIG. 4.

Figure 4:
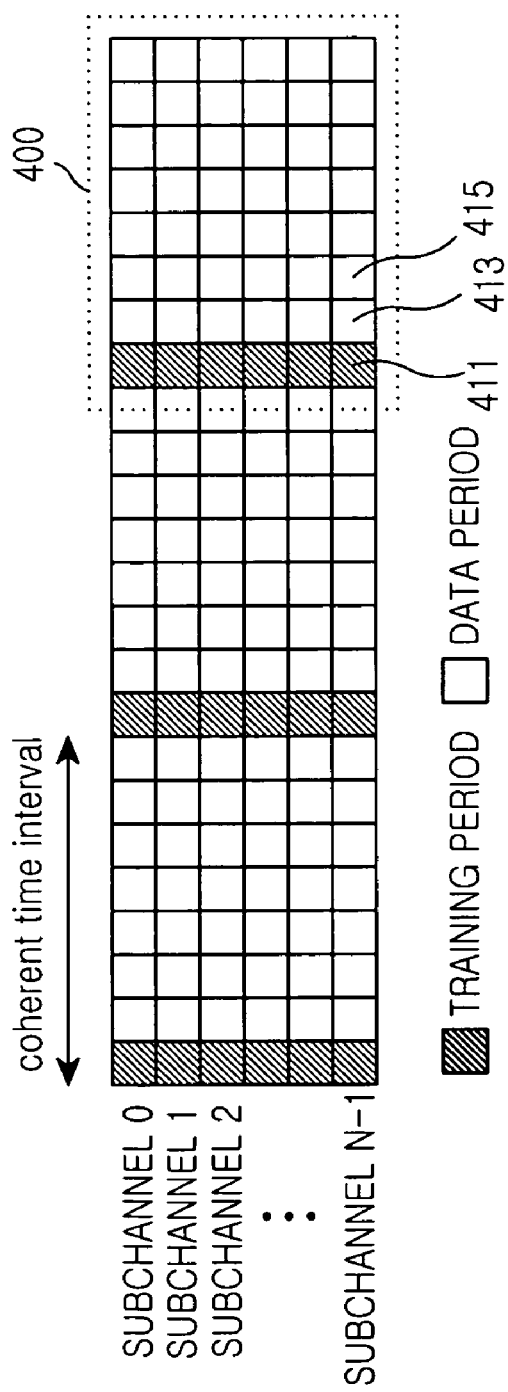
FIG. 4 schematically illustrates a transmission symbol structure in an OFDM mobile communication system.

FIG. 4 schematically illustrates a transmission symbol structure in an OFDM mobile communication system. Referring to FIG. 4, one frame 400 for the OFDM mobile communication system has N subcarriers, i.e., N subchannels, and also has a training period 411 for transmitting training symbols and data periods 413 and 415 for transmitting data symbols. The training symbol is a symbol scheduled for initial channel estimation, and is a symbol both a transmitter and a receiver know. The invention performs initial channel estimation in the training period 411, restores a transmission symbol in the data period 413 using a channel frequency response's variations acquired during the initial channel estimation, and updates a channel frequency response of the data period 415 based on the transmission symbol restoration result of the data period 413.

Now, a description will be made of channel estimation, i.e., initial channel estimation, in the training period according to the present invention.

First, as described in conjunction with Equation (10), the number of equations including channel estimation-related parameters is 2, and the number of the parameters is 4, i.e., there are 4 parameters of $h_0$, $h_1$, $\Delta_0$, and $\Delta_1$. Therefore, it is impossible to calculate the parameter values. Accordingly, the present invention proposes new training symbols in accordance with Equation (11) below in order to calculate the 4 parameters $h_0$, $h_1$, $\Delta_0$, and $\Delta_1$.

$$|s_0|^2=2$$

$$|s_1|^2=0 \qquad (11)$$

As illustrated in Equation (11), in the training period, a training symbol of $|s_0|^2=2$ is transmitted over a $2m^{th}$ subcarrier of a first transmission antenna and a training symbol of $|s_1|^2=0$ is transmitted over a $(2m+1)^{th}$ subcarrier of the first transmission antenna. At the same time, a training symbol of $|s_1|^2=0$ is transmitted over a 2mth subcarrier of a second transmission antenna and a training symbol of $|s_0|^2=2$ is transmitted over an $(2m+1)^{th}$ subcarrier of the second transmission antenna. Then the receiver receives signals defined in Equation (12) as:

$$r_0=h_0 s_0+n_0$$

$$r_1=(h_1+\Delta_1)s_0^*+n_1 \qquad (12)$$

In Equation (12), $n_0$ denotes a noise added to a signal transmitted over an $2m^{th}$ subcarrier, and $n_1$ denotes a noise added to a signal transmitted over an $(2m+1)^{th}$ subcarrier. In addition, comparing Equation (12) with Equation (11), i.e., comparing a case where the training symbol proposed in the invention is applied with a case where the proposed training symbol is not applied, it is noted that the number of channel estimation-related parameters is reduced to 2, i.e., $h_0$ and $(h_1+\Delta_1)$. Moreover, if it is assumed in Equation (12) that the noises no and n, are so small to be negligible, then Equation (12) can be rewritten as set forth in Equation (13):

$$h_0=r_0 s_0^*/2$$

$$h_1+\Delta_1=r_1 s_0/2 \qquad (13)$$

Because it is assumed herein that $h_0=h_0[1,2m]$ and $h_1+\Delta_1=h_1[1,2m]+\Delta_{1,m}[1]=h_1[1,2m+1]$, a channel frequency response $h_0$ at $2m^{th}$ subchannels of a first transmission antenna Tx.ANT1 and a channel frequency response $(h_1+\Delta_1)$ at $(2m+1)^{th}$ subchannels of a second transmission antenna Tx.ANT2 can be calculated. Therefore, a channel frequency response's variation $\Delta_{0,m}[1]$ between the $2m^{th}$ subchannels of the first transmission antenna Tx.ANT1 and $(2m+1)^{th}$ subchannels of the first transmission antenna Tx.ANT1 can be calculated from channel frequency responses $h_0[1,2m]$ at the $2m^{th}$ subchannels of the first transmission antenna Tx.ANT1, and a channel frequency response's variation $\Delta_{1,m}[1]$ between the $2m^{th}$ subchannels of the second transmission antenna Tx.ANT2 and $(2m+1)^{th}$ subchannels of the second transmission antenna Tx.ANT2 can be calculated from channel frequency responses $h_1[1,2m+1]$ at the $(2m+1)^{th}$ subchannels of the second transmission antenna Tx.ANT2, by linear interpolation in accordance with Equation (14) below.

$$\Delta_{0,m}[1] = \frac{h_0[1, 2m+2] - h_0[1, 2m]}{2} \qquad (14)$$

$$\Delta_{1,m}[1] = \frac{h_1[1, 2m+3] - h_1[1, 2m+1]}{2}$$

A process of calculating the channel frequency response's variation $\Delta_{0,m}[1]$ and the channel frequency response's variation $\Delta_{1,m}[1]$ by linear interpolation will be described later with reference to FIG. 5.

In addition, channel frequency responses $h_0[1,2m+1]$ at $(2m+1)^{th}$ subchannels of the first transmission antennas Tx.ANT1 and channel frequency responses $h_1[1,2m]$ at $2m^{th}$ subchannels of the second transmission antennas Tx.ANT2 can be calculated as set forth in Equation (15) by $$h_0[1,2m+1]=h_0[1,2m]+\Delta_{0,m}[1]$$

$$h_1[1,2m]=h_1[1,2m+1]-\Delta_{1,m}[1] \qquad (15)$$

By setting the training symbols as illustrated in Equation (11) in the training period before transmission and then performing simple linear interpolation, it is possible to accurately calculate all the channel estimation-related parameters through Equations (13) to (15), thereby enabling accurate channel estimation.

Now, the linear interpolation scheme in the training period will be described with reference to FIG. 5.

Figure 5:
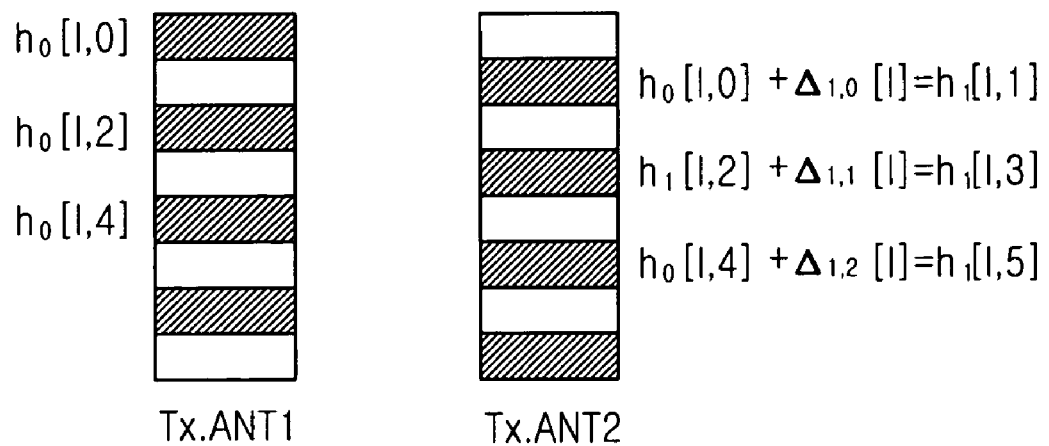
FIG. 5 schematically illustrates a linear interpolation scheme in a training period in an OFDM mobile communication system according to an embodiment of the present invention.

FIG. 5 schematically illustrates a linear interpolation scheme in a training period in an OFDM mobile communication system according to an embodiment of the present invention. Referring to FIG. 5, in the training period, a training symbol of $|s_0|^2=2$ is transmitted over a $2m^{th}$ subcarrier of a first transmission antenna and a training symbol of $|s_1|^2=0$ is transmitted over a $(2m+1)^{th}$ subcarrier of the first transmission antenna. At the same time, a training symbol of $|s_1|^2=0$ is transmitted over a $2m^{th}$ subcarrier of a second transmission antenna and a training symbol of $|s_0|^2=2$ is transmitted over a $(2m+1)^{th}$ subcarrier of the second transmission antenna. Therefore, a receiver can determine channel frequency responses $h_0[1,2m]$ at $2m^{th}$ subcarriers, or subchannels, of the first transmission antenna Tx.ANT1, and channel frequency responses $h_1[1,2m+1]$ at $(2m+1)^{th}$ subcarriers, or subchannels, of the second transmission antenna Tx.ANT2, through a simple linear operation of Equation (13). However, as illustrated in FIG. 5, the receiver cannot determine channel frequency responses $h_0[1,2m+1]$ of $(2m+1)^{th}$ subcarriers of the first transmission antenna Tx.ANT1 and channel frequency responses $h_1[1,2m]$ of $2m^{th}$ subcarriers of the second transmission antenna Tx.ANT2. Therefore, the receiver calculates channel frequency responses $h_0[1,2m+1]$ of $(2m+1)^{th}$ subcarriers of the first transmission antenna Tx.ANT1 and channel frequency responses $h_1[1,2m]$ of $2m^{th}$ subcarriers of the second transmission antenna Tx.ANT2, using the determined channel frequency responses $h_0[1,2m]$ of $2m^{th}$ subcarriers of the first transmission antenna Tx.ANT1 and the determined channel frequency responses $h_1[1,2m+1]$ of $(2m+1)^{th}$ subcarriers of the second transmission antenna Tx.ANT2. This process will be described in detail herein below.

First, a process of calculating channel frequency responses $h_0[1,2m+1]$ of $(2m+1)^{th}$ subcarriers of the first transmission antenna Tx.ANT1 will be described below. Because channel frequency responses $h_0[1,2m]$ of $2m^{th}$ subcarriers of the first transmission antenna Tx.ANT1 are known, a channel frequency response's variation $\Delta_{0,m}[1]$ between channel frequency responses $h_0[1,2m]$ of $2m^{th}$ subcarriers of the first transmission antenna Tx.ANT1 and channel frequency responses $h_0[1,2m+1]$ of $(2m+1)^{th}$ subcarriers of the first transmission antenna Tx.ANT1 is calculated by halving a difference between channel frequency responses $h_0[1,2m]$ of $2m^{th}$ subcarriers of the first transmission antenna Tx.ANT1. That is, a channel frequency response's variation $\Delta_{0,m}[1]$ between channel frequency responses $h_0[1,2m]$ of $2m^{th}$ subcarriers of the first transmission antenna Tx.ANT1 and channel frequency responses $h_0[1,2m+1]$ of $(2m+1)^{th}$ subcarriers of the first transmission antenna Tx.ANT1 can be calculated by halving a difference between channel frequency responses of $2m^{th}$ subcarriers and $(2m+1)^{th}$ subcarriers of the first transmission antenna Tx.ANT1. Therefore, channel frequency responses $h_0[1,2m+1]$ of $(2m+1)^{th}$ subcarriers of the first transmission antenna Tx.ANT1 can be calculated by adding the channel frequency response's variation $\Delta_{0,m}[1]$ to the channel frequency responses $h_0[1,2m]$ of $2m^{th}$ subcarriers of the first transmission antenna Tx.ANT1.

Next, a process of calculating channel frequency responses $h_1[1,2m]$ of $2m^{th}$ subcarriers of the second transmission antenna Tx.ANT2 will be described below. Because channel frequency responses $h_1[1,2m+1]$ of $(2m+1)^{th}$ subcarriers of the second transmission antenna Tx.ANT2 are known, a channel frequency response's variation $\Delta_{1,m}[1]$ between channel frequency responses $h_1[1,2m+1]$ of $(2m+1)^{th}$ subcarriers of the second transmission antenna Tx.ANT2 and channel frequency responses $h_1[1,2m]$ of $2m^{th}$ subcarriers of the second transmission antenna Tx.ANT2 is calculated by halving a difference between channel frequency responses $h_1[1,2m+1]$ of $(2m+1)^{th}$ subcarriers of the second transmission antenna Tx.ANT2. That is, a channel frequency response's variation $\Delta_{1,m}[1]$ between channel frequency responses $h_1[1,2m+1]$ of $(2m+1)^{th}$ subcarriers of the second transmission antenna Tx.ANT2 and channel frequency responses $h_1[1,2m]$ of $2m^{th}$ subcarriers of the second transmission antenna Tx.ANT2 can be calculated by halving a difference between channel frequency responses of $(2m+1)^{th}$ subcarriers and $(2m+3)^{th}$ subcarriers of the second transmission antenna Tx.ANT2. Therefore, channel frequency responses $h_1[1,2m]$ of $2m^{th}$ subcarriers of the second transmission antenna Tx.ANT2 can be calculated by subtracting the channel frequency response's variation $\Delta_{1,m}[1]$ from the channel frequency responses $h_1[1,2m+1]$ of $(2m+1)^{th}$ subcarriers of the second transmission antenna Tx.ANT2.

Channel estimation in the data period, i.e., channel estimation for a decoded data symbol, will now be described below.

A symbol restoration formula of Equation (16) below can be derived from Equation (9).

$$\hat{s}_0 = \frac{(h_0^* r_0 + h_1 r_1^*)(|h_0|^2 + |h_1|^2 + h_0 \Delta_0^*) + (h_1^* r_0 - h_0 r_1^*)(h_1 \Delta_0^*)}{(|h_0|^2 + |h_1|^2 + h_0 \Delta_0^*)(|h_0|^2 + |h_1|^2 + h_0 \Delta_1^*) - (h_0 h_1 \Delta_0^* \Delta_1^*)} \quad (16)$$

$$\hat{s}_1 = \frac{(h_0^* r_0 - h_1 r_1^*)(|h_0|^2 + |h_1|^2 + h_0 \Delta_0^*) + (h_1^* r_0 + h_0 r_1^*)(h_1 \Delta_0^*)}{(|h_0|^2 + |h_1|^2 + h_0 \Delta_0^*)(|h_0|^2 + |h_1|^2 + h_0 \Delta_1^*) - (h_0 h_1 \Delta_0^* \Delta_1^*)}$$

Because $|h_0|^2+|h_1|^2>>\Delta_0\Delta_1$ in a general channel environment, Equation (16) can be simplified as set forth in Equation (17):

$$\hat{s}_0 = \frac{h_0^* r_0 + h_1 r_1^*}{|h_0|^2 + |h_1|^2 + h_1 \Delta_1^*} + \frac{h_1^* r_0 - h_0 r_1^*}{|h_0|^2 + |h_1|^2 + h_0 \Delta_0^*} \cdot \frac{h_1 \Delta_0^*}{|h_0|^2 + |h_1|^2 + h_1 \Delta_1^*} \quad (17)$$

$$\hat{s}_1 = \frac{h_1^* r_0 + h_0 r_1^*}{|h_0|^2 + |h_1|^2 + h_0 \Delta_0^*} + \frac{h_0^* r_0 - h_1 r_1^*}{|h_0|^2 + |h_1|^2 + h_1 \Delta_1^*} \cdot \frac{h_0 \Delta_1^*}{|h_0|^2 + |h_1|^2 + h_0 \Delta_0^*}$$

It should be understood from Equation (17) that because $s_0$=A+BC and $s_1$=B+AD, a required number of calculations is minimized. As a result, it is possible to restore transmission symbols in a current data period through Equation (17).

In the data period, it is impossible to set a symbol value to a preset value like training symbols of the training period. Therefore, in order to reduce the number of channel estimation-related parameters from 4 to 2 in Equation (10), the $\Delta_{0,m}[1]$ and $\Delta_{1,m}[1]$ are assumed as already known $\Delta_{0,m}[1-1]$ and $\Delta_{1,m}[1-1]$ of a just previous symbol. Then, channel information of the data period can be acquired by Equation (18) below using a received signal and a restored transmission symbol.

$$h_0[1, 2m] = \frac{r_0 s_0^* - r_1 s_1}{2} + \frac{-\Delta_{0,m}[1-1] + \Delta_{1,m}[1-1]s_0^* s_1}{2} \quad (18)$$

$$h_1[1, 2m] = \frac{r_0 s_0^* - r_1 s_0}{2} + \frac{-\Delta_{1,m}[1-1] + \Delta_{0,m}[1-1]s_1^* s_0}{2}$$

Figure 6:
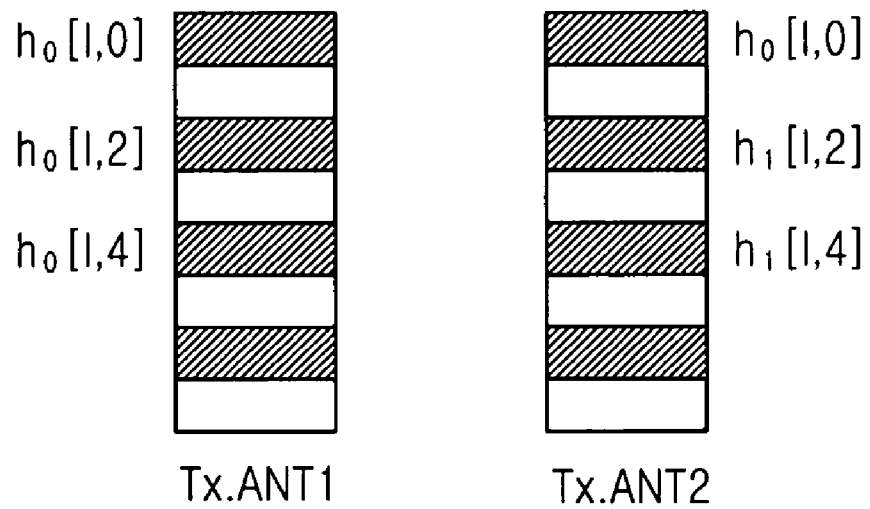
FIG. 6 schematically illustrates a linear interpolation scheme in a data period in an OFDM mobile communication system according to an embodiment of the present invention.

FIG. 6 schematically illustrates a linear interpolation scheme in a data period in an OFDM mobile communication system according to an embodiment of the present invention. Referring to FIG. 6, in the data period, unlike in the training period, a channel frequency response of a current symbol period is detected by Equation (18) using a channel frequency response's variation calculated in a previous symbol period. That is, as illustrated in FIG. 6, channel frequency responses $h_0[1,2m]$ at $2m^{th}$ subcarriers, or subchannels, of a first transmission antenna Tx.ANT1 and channel frequency responses $h_1[1,2m]$ at $2m^{th}$ subcarriers, or subchannels, of a second transmission antenna Tx.ANT2 can be determined through Equation (18). However, even though Equation (18) is used, channel frequency responses $h_0[1,2m+1]$ of $(2m+1)^{th}$ subcarriers of the first transmission antenna Tx.ANT1 and channel frequency responses $h_1[1,2m+1]$ of $(2m+1)^{th}$ subcarriers of the second transmission antenna Tx.ANT2 cannot be determined as illustrated in FIG. 6. Therefore, channel frequency responses $h_0[1,2m+1]$ of $(2m+1)^{th}$ subcarriers of the first transmission antenna Tx.ANT1 and channel frequency responses $h_1[1,2m+1]$ of $(2m+1)^{th}$ subcarriers of the second transmission antenna Tx.ANT2 are calculated using the determined channel frequency responses $h_0[1,2m]$ of $2m^{th}$ subcarriers of the first transmission antenna Tx.ANT1 and the determined channel frequency responses $h_1[1,2m]$ of $2m^{th}$ subcarriers of the second transmission antenna Tx.ANT2. This process will be described in detail herein below.

First, a process of calculating channel frequency responses $h_0[1,2m+1]$ of $(2m+1)^{th}$ subcarriers of the first transmission antenna Tx.ANT1 will be described below. Since channel frequency responses $h_0[1,2m]$ of $2m^{th}$ subcarriers of the first transmission antenna Tx.ANT1 are known, a channel frequency response's variation $\Delta h_{0,m}[1]$ between channel frequency responses $h_0[1,2m]$ of $2m^{th}$ subcarriers of the first transmission antenna Tx.ANT1 and channel frequency responses $h_0[1,2m+1]$ of $(2m+1)^{th}$ subcarriers of the first transmission antenna Tx.ANT1 is calculated by halving a difference between channel frequency responses $h_0[1,2m]$ of $2m^{th}$ subcarriers of the first transmission antenna Tx.ANT1. That is, a channel frequency response's variation $\Delta_{0,m}[1]$ between channel frequency responses $h_0[1,2m]$ of $2m^{th}$ subcarriers of the first transmission antenna Tx.ANT1 and channel frequency responses $h_0[1,2m+1]$ of $(2m+1)^{th}$ subcarriers of the first transmission antenna Tx.ANT1 can be calculated by halving a difference between channel frequency responses of $2m^{th}$ subcarriers and $(2m+2)^{th}$ subcarriers of the first transmission antenna Tx.ANT1. Therefore, channel frequency responses $h_0[1,2m+1]$ of $(2m+1)^{th}$ subcarriers of the first transmission antenna Tx.ANT1 are calculated by adding the channel frequency response's variation $\Delta_{0,m}[1]$ to the channel frequency responses $h_0[1,2m]$ of $2m^{th}$ subcarriers of the first transmission antenna Tx.ANT1.

Next, a process of calculating channel frequency responses $h_1[1,2m+1]$ of $(2m+1)^{th}$ subcarriers of the second transmission antenna Tx.ANT2 will be described below. Because channel frequency responses $h_1[1,2m]$ of $2m^{th}$ subcarriers of the second transmission antenna Tx.ANT2 are known, a channel frequency response's variation $\Delta_{1,m}[1]$ between channel frequency responses $h_1[1,2m]$ of $2m^{th}$ subcarriers of the second transmission antenna Tx.ANT2 and channel frequency responses $h_1[1,2m+1]$ of $(2m+1)^{th}$ subcarriers of the second transmission antenna Tx.ANT2 is calculated by halving a difference between channel frequency responses $h_1[1,2m]$ of $2m^{th}$ subcarriers of the second transmission antenna Tx.ANT2. That is, a channel frequency response's variation $\Delta_{1,m}[1]$ between channel frequency responses $h_11[1,2m]$ of $2m^{th}$ subcarriers of the second transmission antenna Tx.ANT2 and channel frequency responses $h_1[1,2m+1]$ of $(2m+1)^{th}$ subcarriers of the second transmission antenna Tx.ANT2 are calculated by halving a difference between channel frequency responses of $2m^{th}$ subcarriers and $(2m+2)^{th}$ subcarriers of the second transmission antenna Tx.ANT2. Therefore, channel frequency responses $h_1[1,2m+1]$ of $(2m+1)^{th}$ subcarriers of the second transmission antenna Tx.ANT2 can be calculated by adding the channel frequency response's variation $\Delta_{1,m}[1]$ to the channel frequency responses $h_1[1,2m]$ of $2m^{th}$ subcarriers of the second transmission antenna Tx.ANT2. As a result, it is possible to determine an accurate variation between subchannels even in a data period, thereby enabling accurate channel estimation.

With reference to FIG. 7, a comparison of the number of calculations will now be made between a channel estimation method using the STC scheme disclosed in the reference entitled "A Simple Transmit Diversity Technique For Wireless Communications" proposed by S. Alamouti (hereinafter referred to as a "channel estimation method proposed by S. Alamouti"), a channel estimation method using the SFC scheme disclosed in the reference entitled "Asymptotic Performance Of Transmit Diversity Via OFDM For Multipath Channels" proposed by N. Ahmed and R. Baraniuk (hereinafter referred to as a "channel estimation method proposed by N. Ahmed and R. Baraniuk"), and the channel estimation method proposed in the present invention.

As indicated above, FIG. 7 is a table illustrating a comparison of the number of calculations between the channel estimation method proposed by S. Alamouti, the channel estimation method proposed by N. Ahmed and R. Baraniuk, and the channel estimation method proposed in the present invention. Referring to FIG. 7, the number of calculations in a training period and a data period will first be described for the channel estimation method proposed by S. Alamouti and the channel estimation method proposed by N. Ahmed and R. Baraniuk.

First, in the training period, for initial channel information estimation, only real addition is performed 6N times while complex multiplication, real multiplication, complex division, and real division are not performed. Here, N indicates the number of subcarriers in the OFDM mobile communication system. Second, in the data period, for channel information update, only real addition is performed 6N times while complex multiplication, real multiplication, complex division, and real division are not performed. Moreover, in the data period, for transmission symbol restoration, complex multiplication is performed 2N times, real multiplication is performed 2N times, complex division is not performed, real division is performed 2N times, and real addition is performed 3.5N times.

Next, the number of calculations in a training period and a data period will be described for the channel estimation method proposed in the present invention.

First, in the training period, for initial channel information estimation, only real addition is performed 3N times while complex multiplication, real multiplication, complex division, and real division are not performed. Second, in the data period, for channel information update, only real addition is performed 13N times while complex multiplication, real multiplication, complex division, and real division are not performed. Moreover, in the data period, for transmission symbol restoration, complex multiplication is performed 5N times, real multiplication is performed 2N times, complex division is performed 2N times, real division is not performed, and real addition is performed 6.5N times.

As described in conjunction with FIG. 7, the channel estimation method proposed by S. Alamouti, the channel estimation method proposed by N. Ahmed and R. Baraniuk, and the channel estimation method proposed by the present invention all require only addition operations for channel information estimation in the training period and the data period, so realizations thereof are very simple. For transmission symbol restoration in the data period, the number of calculations required in the new channel estimation method is about 2 times larger than the number of calculations required in the conventional channel estimation methods. However, the increase in the number of calculations in the new channel estimation method does not function as a load in the OFDM mobile communication system.

Figure 8:
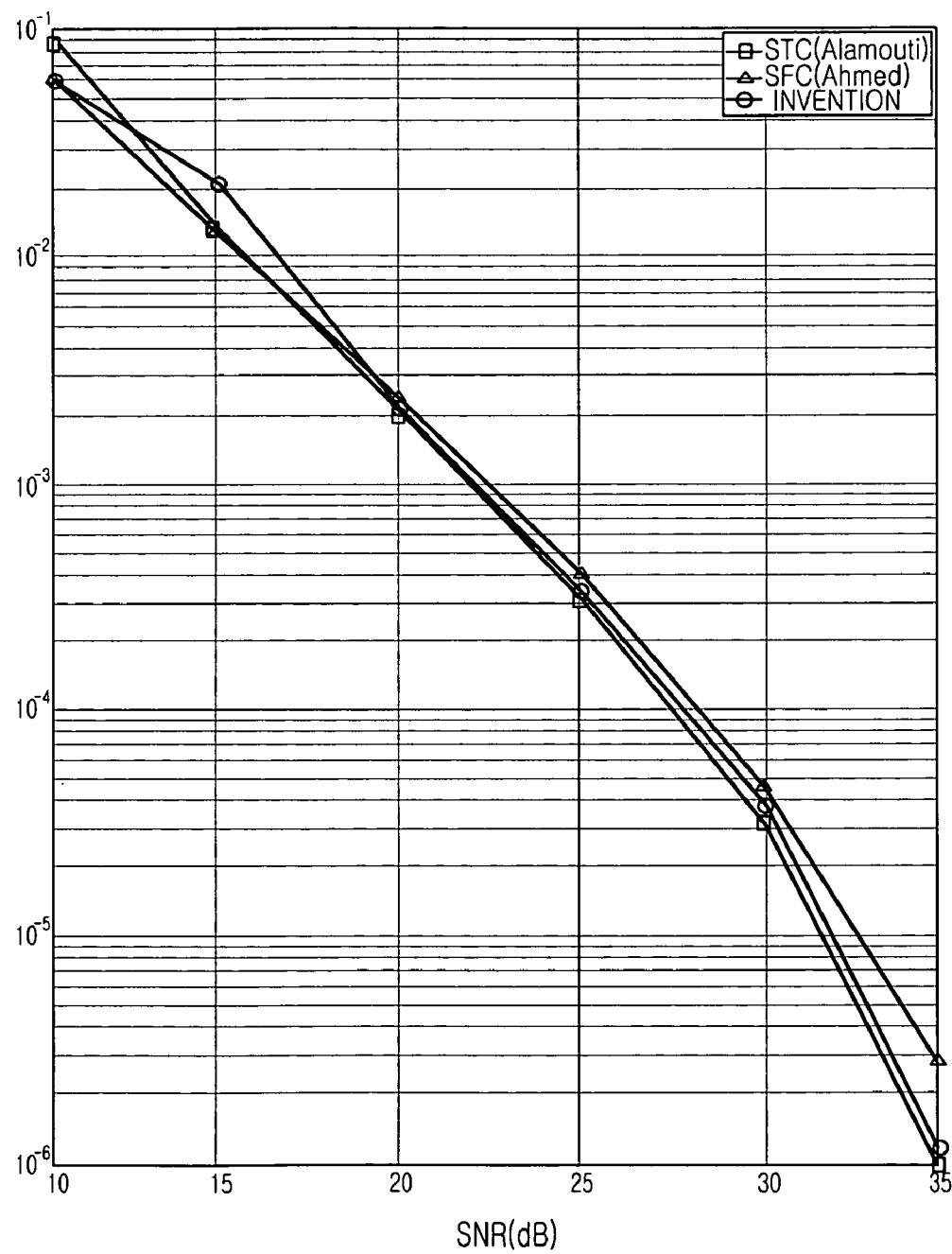
FIG. 8 is a graph illustrating SNR-to-BER characteristics of the channel estimation method proposed by S. Alamouti, the channel estimation method proposed by N. Ahmed and R. Baraniuk, and the channel estimation method proposed by the invention in a channel environment where a channel frequency response between two consecutive symbols and a channel frequency response between two consecutive subcarriers are constant.

FIG. 8 is a graph illustrating SNR-to-BER characteristics of the channel estimation method proposed by S. Alamouti, the channel estimation method proposed by N. Ahmed and R. Baraniuk, and the channel estimation method proposed by the present invention in a channel environment where a channel frequency response between two consecutive symbols and a channel frequency response between two consecutive subcarriers are constant.

Before a description of FIG. 8, it will be assumed that in order to measure the SNR-to-BER characteristic, a frequency band is set to 500 KHz, 128 subcarriers are used, and channel estimation is performed in a Rayleigh fading channel environment in which transmission power of 9 multiple paths is exponentially decreased. In FIG. 8, SNR-to-BER characteristics are compared in a channel environment with fdTs=0.0014 and Sf=125 KHz, i.e., in a channel environment where a channel variation with the passage of time is negligible and frequency selective fading is also negligible. Here, fd denotes a Doppler frequency, Ts denotes a symbol period, and Sf denotes a coherent frequency band. The channel environment with fdTs=0.0014 and Sf=125 KHz, i.e., the channel environment where a channel variation with the passage of time is negligible and frequency selective fading is also negligible, is almost identical to the channel environment corresponding to a fundamental hypothesis for the channel estimation method proposed by S. Alamouti, i.e., a hypothesis where a channel frequency response between two consecutive symbols remains unchanged, and a fundamental hypothesis for the channel estimation method proposed by N. Ahmed and R. Baraniuk, i.e., a hypothesis where a channel frequency response between two consecutive subcarriers remains unchanged. Therefore, in such a channel environment, the channel estimation method proposed by S. Alamouti, the channel estimation the method proposed by N. Ahmed and R. Baraniuk, and the channel estimation method proposed by the present invention show almost the same SNR-to-BER characteristics, as is illustrated in FIG. 8.

However, as described above, it is impossible that in an actual channel environment, a channel frequency response between two consecutive symbols remains unchanged and a channel frequency response between two consecutive subcarriers remains unchanged. Therefore, with reference to FIG. 9, a description will be made of a relation between SNR and BER of the channel estimation method proposed by S. Alamouti, the channel estimation method proposed by N. Ahmed and R. Baraniuk, and the channel estimation method proposed by the present invention in a channel environment where a channel frequency response between two consecutive symbols is frequently changed.

Figure 9:
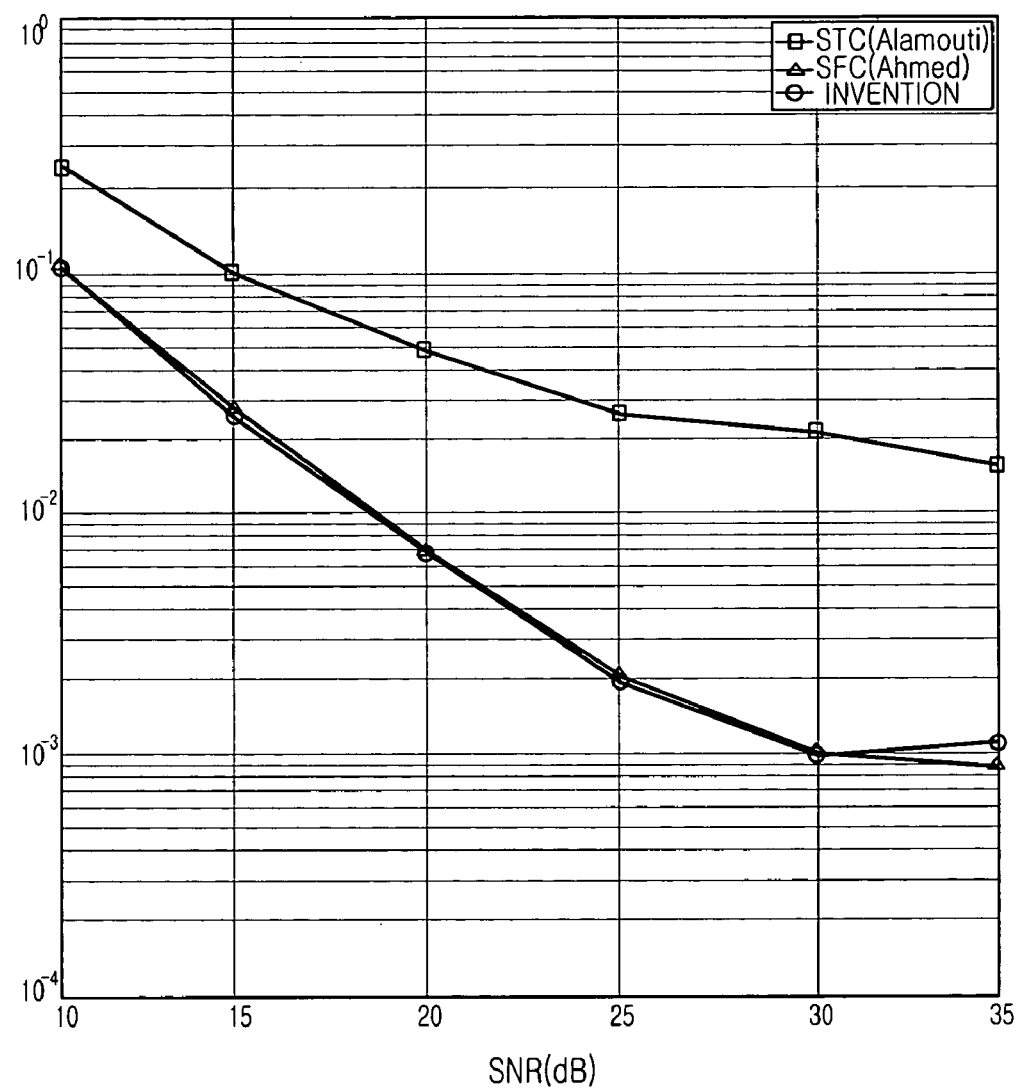
FIG. 9 is a graph illustrating SNR-to-BER characteristics of the channel estimation method proposed by S. Alamouti, the channel estimation method proposed by N. Ahmed and R. Baraniuk, and the channel estimation method proposed by the invention in a channel environment where a channel frequency response between two consecutive subcarriers is constant while a channel frequency response between two consecutive symbols is considerably changed.

As indicated above, FIG. 9 is a graph illustrating SNR-to-BER characteristics of the channel estimation method proposed by S. Alamouti, the channel estimation method proposed by N. Ahmed and R. Baraniuk, and the channel estimation method proposed by the present invention in a channel environment where a channel frequency response between two consecutive subcarriers is constant while a channel frequency response between two consecutive symbols is considerably changed.

Before a description of FIG. 9, it will be assumed herein, as in FIG. 8, that in order to measure the SNR-to-BER characteristic, a frequency band is set to 500 KHz, 128 subcarriers are used, and channel estimation is performed in a Rayleigh fading channel environment in which transmission power of 9 multiple paths is exponentially decreased. In FIG. 9, SNR-to-BER characteristics are compared in a channel environment with fdTs=0.014 and Sf=125 KHz, i.e., in a channel environment where a channel variation with the passage of time is considerable and frequency selective fading is negligible. The channel environment with fdTs=0.014 and Sf=125 KHz, i.e., the channel environment where a channel variation with the passage of time is significant and frequency selective fading is negligible, is almost identical to the channel environment corresponding to a fundamental hypothesis for the channel estimation method proposed by N. Ahmed and R. Baraniuk, i.e., a hypothesis where a channel frequency response between two consecutive subcarriers remains unchanged, but is different from the channel environment corresponding to a fundamental hypothesis for the channel estimation method proposed by S. Alamouti, i.e., a hypothesis where a channel frequency response between two consecutive symbols remains unchanged. Therefore, in such a channel environment, the channel estimation method proposed by N. Ahmed and R. Baraniuk and the channel estimation method proposed by the present invention show almost same SNR-to-BER characteristics, but the channel estimation method proposed by S. Alamouti shows considerable performance deterioration in the SNR-to-BER characteristic, as is illustrated in FIG. 9.

Figure 10:
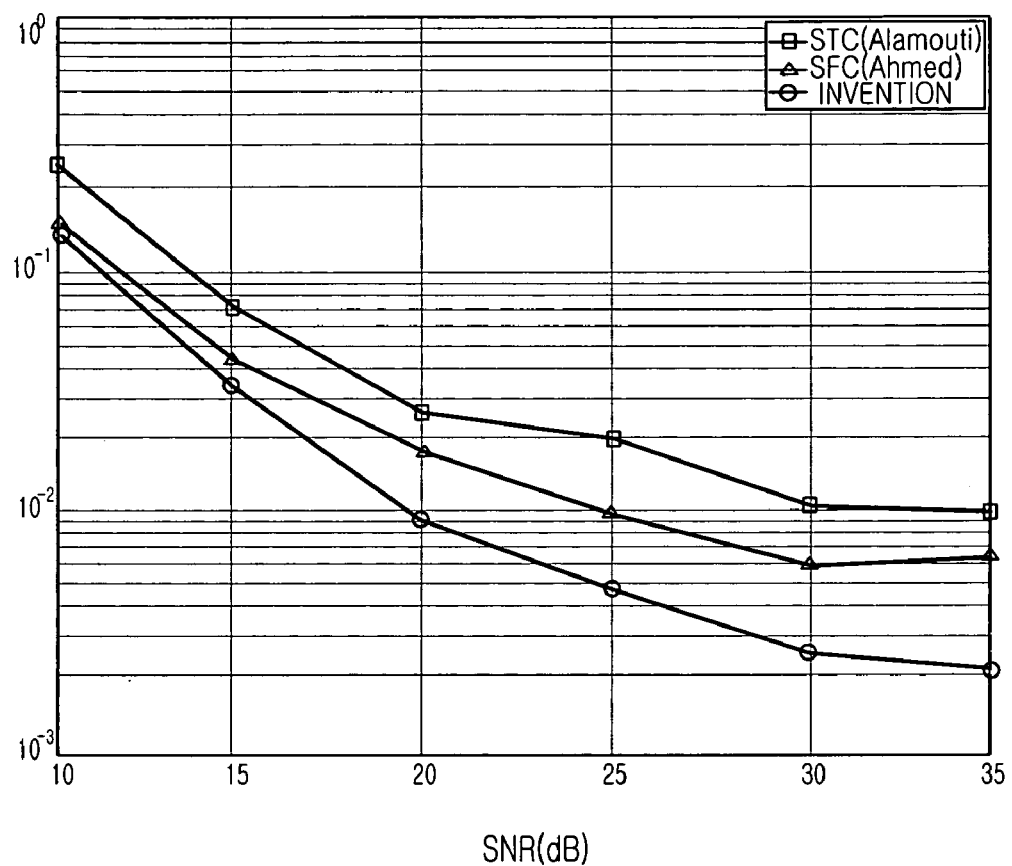
FIG. 10 is a graph illustrating SNR-to-BER characteristics of the channel estimation method proposed by S. Alamouti, the channel estimation method proposed by N. Ahmed and R. Baraniuk, and the channel estimation method proposed by the invention in a channel environment where a channel frequency response between two consecutive symbols and a channel frequency response between two consecutive subcarriers are both considerably changed.

FIG. 10 is a graph illustrating SNR-to-BER characteristics of the channel estimation method proposed by S. Alamouti, the channel estimation method proposed by N. Ahmed and R. Baraniuk, and the channel estimation method proposed by the invention in a channel environment where a channel frequency response between two consecutive symbols and a channel frequency response between two consecutive subcarriers are both considerably changed.

Before a description of FIG. 10, it will be assumed herein, as it was in FIGS. 8 and 9, that in order to measure the SNR-to-BER characteristic, a frequency band is set to 500 KHz, 128 subcarriers are used, and channel estimation is performed in a Rayleigh fading channel environment in which transmission power of 9 multiple paths is exponentially decreased. In FIG. 10, SNR-to-BER characteristics are compared in a channel environment with fdTs=0.014 and Sf=31 KHz, i.e., in a channel environment where a channel variation with the passage of time is comparatively considerable and frequency selective fading is also considerable. The channel environment with fdTs=0.014 and Sf=31 KHz, i.e., the channel environment where a channel variation with the passage of time is significant and frequency selective fading is also significant, is different from the channel environment corresponding to a fundamental hypothesis for the channel estimation method proposed by S. Alamouti, i.e., a hypothesis where a channel frequency response between two consecutive symbols remains unchanged, and is also different from the channel environment corresponding to a fundamental hypothesis for the channel estimation method proposed by N. Ahmed and R. Baraniuk, i.e., a hypothesis where a channel frequency response between two consecutive subcarriers remains unchanged. Therefore, in such a channel environment, the channel estimation method proposed by S. Alamouti and the channel estimation method proposed by N. Ahmed and R. Baraniuk both show considerable performance deterioration in the SNR-to-BER characteristic, as is illustrated in FIG. 10. However, as illustrated in FIG. 10, the new channel estimation method proposed by the present invention is superior in terms of performance.

Although the channel estimation method according to the invention has been described with reference to an OFDM mobile communication system for the convenience of explanation, the invention can be applied even to a multicarrier system as well as the OFDM mobile communication system.

As can be understood from the foregoing description, the present invention performs accurate channel estimation in a training period and a data period using a training symbol and a linear interpolation scheme in an OFDM mobile communication system. In addition, the invention performs channel estimation considering both channel information and channel variation between subcarriers in an OFDM mobile communication system, enabling channel estimation adaptive to an actual channel environment and thus contributing to improvement in system performance.

While the present invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for estimating a channel condition in a mobile communication system in which a transmitter includes a first transmission antenna and a second transmission antenna, the first and second transmission antennas transmitting signals through at least one odd subcarrier and at least one even subcarrier, respectively, the method comprising the steps of:
  (a) generating by the transmitter a first symbol and a second symbol to be used for an initial channel estimation of a receiver;
  (b) encoding by the transmitter the first symbol and the second symbol by a preset transmit diversity scheme for a preset period, and transmitting the encoded first and second symbols to the receiver through the at least one odd carrier and the at least one even carrier of each of the first and second transmission antennas;
  (c) receiving by the receiver a signal for the preset period, and calculating channel frequency responses of the at least one odd carrier of the first transmission antenna and channel frequency responses of the at least one even carrier of the second transmission antenna; and
  (d) estimating by the receiver channel frequency responses of the at least one even carrier of the first transmission antenna and channel frequency responses of the at least one odd carrier of the second transmission antenna by using the calculated channel frequency responses.

2. The method of claim 1, wherein the step (d) comprises the steps of:
  calculating channel variations between the channel frequency responses of the at least one odd carrier of the first transmission antenna and the channel frequency responses of the at least one even carrier of the first transmission antenna by linear-interpolating the channel frequency responses of the at least one odd carrier of the first transmission antenna, and calculating channel variations between the channel frequency responses of the at least one even carrier of the second transmission antenna and the channel frequency responses of the at least one odd carrier of the second transmission antenna by linear-interpolating the channel frequency responses of the at least one even carrier of the second transmission antenna; and
  estimating the channel frequency responses of the at least one even carrier of the first transmission antenna by subtracting channel variations between the channel frequency responses of the at least one odd carrier of the first transmission antenna and the channel frequency responses of the at least one even carrier of the first transmission antenna from the channel frequency responses of the at least one odd carrier of the first transmission antenna, and estimating channel frequency responses of the at least one odd carrier of the second transmission antenna by adding the channel variations between the channel frequency responses of the at least one even carrier of the second transmission antenna and the channel frequency response of the at least one odd carrier of the second transmission antenna to the channel frequency responses of the at least one even carrier of the second transmission antenna.

3. The method of claim 2, wherein the first and second symbols are training symbols defined as $$|s_0|^2 = 2$$

$$|s_1|^2 = 0$$

where $s_0$ denotes the first symbol and $s_1$ denotes the second symbol.

4. The method of claim 3, wherein the channel variations between the channel frequency responses of the at least one odd carrier of the first transmission antenna and the channel frequency responses of the at least one even carrier of the first transmission antenna are expressed as $$\Delta_{0,m}[1] = \frac{h_0[1, 2m+2] - h_0[1, 2m]}{2}$$

where $\Delta_{0,m}[1]$ denotes the channel variations between the channel frequency responses of the at least one odd carriers of the first transmission antenna and the channel frequency responses of the at least one even carriers of the first transmission antenna, and $h_0[1,2m]$ and $h_1[1,2m+2]$ denote the channel frequency responses of the at least one odd carrier in an $1^{th}$ symbol period.

5. The method of claim 4, wherein the channel frequency responses of the at least one even carrier of the first transmission antenna are expressed as $$h_0[1,2m+1] = h_0[1,2m] + \Delta_{0,m}[1]$$

where $h_0[1,2m+1]$ denotes the channel frequency responses of the at least one even carrier in an $1^{th}$ symbol period of the first transmission antenna.

6. The method of claim 3, wherein the channel variations between the channel frequency responses of the at least one even carrier of the second transmission antenna and the channel frequency responses of the at least one odd carrier of the second transmission antenna are expressed as $$\Delta_{1,m}[1] = \frac{h_1[1, 2m+3] - h_1[1, 2m+1]}{2}$$

where $\Delta_{1,m}[1]$ denotes the channel variations between the channel frequency responses of the at least one even carrier of the second transmission antenna and the channel frequency responses of the at least one odd carrier of the second transmission antenna, and $h_1[1,2m+1]$ and $h_1[1,2m+3]$ denote the channel frequency responses of the at least one even carrier in an $1^{th}$ symbol period.

7. The method of claim 6, wherein the channel frequency responses of the at least one odd carrier of the second transmission antenna are expressed as $$h_1[1,2m] = h_1[1,2m+1] - \Delta_{1,m}[1]$$

where $h_1[1,2m]$ denotes the channel frequency responses of the at least one odd carrier in an $1^{th}$ symbol period of the second transmission antenna.

8. The method of claim 1, wherein the preset period is a training period.

9. The method of claim 1, wherein the preset transmit diversity scheme is a space-frequency code (SFC) scheme.

10. A method for estimating a channel condition by a receiver in a mobile communication system in which a transmitter includes a first transmission antenna and a second transmission antenna, the first and second transmission antennas transmitting signals through at least one odd carrier and at least one even carrier, the method comprising the steps of:
  (a) receiving a signal for a preset reception period, and restoring the received signal into transmission symbols by decoding the received signal according to a transmit diversity scheme applied in the transmitter;
  (b) estimating channel frequency responses of the at least one odd carrier of the first transmission antenna and channel frequency responses of the at least one odd carrier of the second transmission antenna by using channel variations between the channel frequency responses of the at least one odd carrier of the first transmission antenna and channel frequency responses of the at least one even carrier of the first transmission antenna and channel variations between channel frequency responses of the at least one even carrier of the second transmission antenna and channel frequency responses of the at least one odd carrier of the second transmission antenna, the channel frequency responses being detected from the restored transmission symbols in a previous reception period of the preset reception period; and (c) estimating channel frequency responses of the at least one even carrier of the first transmission antenna and channel frequency responses of the at least one even carrier of the second transmission antennas by using the channel frequency responses of the at least one odd carrier of the first transmission antenna and the channel frequency responses of the at least one odd carrier of the second transmission antenna.

11. The method of claim 10, where step (c) comprises the steps of:

calculating channel variations between the channel frequency responses of the at least one odd carrier of the first transmission antenna and the channel frequency responses of the at least one even carrier of the first transmission antenna by linear-interpolating the channel frequency responses of the at least one odd carrier of the first transmission antenna, and calculating channel variations between the channel frequency responses of the at least one odd carrier of the second transmission antenna and channel frequency responses of the at least one even carrier of the second transmission antenna by linear-interpolating the channel frequency responses of the at least one odd carrier of the second transmission antenna; and estimating channel frequency responses of the at least one even carrier of the first transmission antenna by adding the channel variations between the channel frequency responses of the at least one odd carrier of the first transmission antenna and the channel frequency responses of the at least one even carrier of the first transmission antenna to the channel frequency responses of the at least one odd carrier of the first transmission antenna, and estimating channel frequency responses of the at least one even carrier of the second transmission antenna by adding the channel variations between the channel frequency responses of the at least one odd carrier of the second transmission antenna and the channel frequency responses of the at least one even carriers of the second transmission antenna to channel frequency responses of odd carrier of the second transmission antenna.

12. The method of claim 11, wherein the restored transmission symbols are expressed as $$\hat{s}_0 = \frac{h_0^* r_0 + h_1 r_1^*}{|h_0|^2 + |h_1|^2 + h_1 \Delta_1^*} + \frac{h_1^* r_0 - h_0 r_1^*}{|h_0|^2 + |h_1|^2 + h_0 \Delta_0^*} \cdot \frac{h_1 \Delta_0^*}{|h_0|^2 + |h_1|^2 + h_1 \Delta_1^*}$$

$$\hat{s}_1 = \frac{h_1^* r_0 - h_0 r_1^*}{|h_0|^2 + |h_1|^2 + h_0 \Delta_0^*} + \frac{h_0^* r_0 + h_1 r_1^*}{|h_0|^2 + |h_1|^2 + h_1 \Delta_1^*} \cdot \frac{h_0 \Delta_1^*}{|h_0|^2 + |h_1|^2 + h_0 \Delta_0^*}$$

where $\hat{s}_0$ and $\hat{s}_1$ denote the restored transmission symbols, $r_0$ and $r_1$ denote the received signals, $h_0$ denotes a channel frequency response of the first transmission antenna, $h_1$ denotes a channel frequency response of the second transmission antenna, $\Delta_0$ denotes a channel variation of the first transmission antenna, and $\Delta_1$ denotes a channel variation of the second transmission antenna.

13. The method of claim 12, wherein the channel frequency responses of the at least one odd carrier of the first transmission antenna and the channel frequency responses of the at least one odd carrier of the second transmission antenna are expressed as $$h_0[1, 2m] = \frac{r_0 s_0^* - r_1 s_1}{2} + \frac{-\Delta_{0,m}[1-1] + \Delta_{1,m}[1-1] s_0^* s_1}{2}$$

$$h_1[1, 2m] = \frac{r_0 s_1^* - r_1 s_0}{2} + \frac{-\Delta_{1,m}[1-1] + \Delta_{0,m}[1-1] s_1^* s_0}{2}$$

where $h_0[1,2m]$ denotes the channel frequency responses of odd carriers of the first transmission antenna, $h_1[1,2m]$ denotes channel frequency responses of odd carriers of the second transmission antenna, $s_0$ and $s_1$ denote restored transmission symbols, $\Delta_{0,m}[1-1]$ denotes channel variations between channel frequency responses of odd carriers of the first transmission antenna and channel frequency responses of even carriers of the first transmission antenna, the channel frequency responses being detected in a previous reception period of the preset reception period, and $\Delta_{1,m}[1-1]$ denotes channel variations between channel frequency responses of even carriers of the second transmission antenna and channel frequency responses of odd carriers of the second transmission antenna.

14. The method of claim 10, wherein the preset reception period is a data period.

15. The method of claim 10, wherein the transmit diversity scheme is a space-frequency code (SFC) scheme.

16. A system for estimating a channel condition in a mobile communication system comprising:

a transmitter, which includes a first transmission antenna and a second transmission antenna for transmitting signals through at least one odd carrier and at least one even carrier, for determining a first symbol and a second symbol to be used for initial channel estimation, encoding the first symbol and the second symbol by a preset transmit diversity scheme for a preset time, and transmitting the encoded first and second symbols through the at least one odd carrier and the at least one even carrier of the first transmission antenna and the second transmission antenna; and a receiver for receiving the encoded first and second symbols from the transmitter for the preset period, estimating channel frequency responses of the at least one odd carrier of the first transmission antenna and channel frequency responses of the at least one even carrier of the second transmission antenna, and estimating channel frequency responses of the at least one even carrier of the first transmission antenna and channel frequency responses of the at least one odd carrier of the second transmission antenna by using the estimated channel frequency responses.

17. The system of claim 16, wherein the receiver calculates channel variations between the channel frequency responses of the at least one odd carrier of the first transmission antenna and the channel frequency responses of the at least one even carrier of the first transmission antenna by linear-interpolating the channel frequency responses of the at least one odd carrier of the first transmission antenna, calculates channel variations between the channel frequency responses of the at least one even carrier of the second transmission antenna and the channel frequency responses of the at least one odd carrier of the second transmission antenna by linear-interpolating the channel frequency responses of the at least one even carrier of the second transmission antenna, estimates channel frequency responses of the at least one even carrier of the first transmission antenna by subtracting the channel variations between the channel frequency responses of the at least one odd carrier of the first transmission antenna and the channel frequency responses of the at least one even carrier of the first transmission antenna from the channel frequency responses of the at least one odd carrier of the first transmission antenna, and estimates channel frequency responses of the at least one odd carrier of the second transmission antenna by adding the channel variations between the channel frequency responses of the at least one even carrier of the second transmission antenna and the channel frequency responses of the at least one odd carrier of the second transmission antenna to the channel frequency responses of the at least one even carriers of the second transmission antenna.

18. The system of claim 17, wherein the first and second symbols are training symbols defined as $$|s_0|^2=2$$

$$|s_1|^2=0$$

where $s_0$ denotes the first symbol and $s_1$ denotes the second symbol.

19. The system of claim 18, wherein the channel variations between the channel frequency responses of the at least one odd carrier of the first transmission antenna and the channel frequency responses of the at least one even carrier of the first transmission antenna are expressed as $$\Delta_{0,m}[1] = \frac{h_0[1, 2m+2] - h_0[1, 2m]}{2}$$

where $\Delta_{0,m}[1]$ denotes channel variations between channel frequency responses of the at least one odd carrier of the first transmission antenna and channel frequency responses of the at least one even carrier of the first transmission antenna, and $h_0[1,2m]$ and $h_1[1,2m+2]$ denote channel frequency responses of the at least one odd carrier in an $1^{th}$ symbol period.

20. The system of claim 19, wherein the channel frequency responses of the at least one even carrier of the first transmission antenna are expressed as $$h_0[1,2m+1] = h_0[1,2m] + \Delta_{0,m}[1]$$

where $h_0[1,2m+1]$ denotes channel frequency responses of the at least one even carrier in an $1^{th}$ symbol period of the first transmission antenna.

21. The system of claim 18, wherein the channel variations between the channel frequency responses of the at least one even carrier of the second transmission antenna and the channel frequency responses of the at least one odd carrier of the second transmission antenna are expressed as $$\Delta_{1,m}[1] = \frac{h_1[1, 2m+3] - h_1[1, 2m+1]}{2}$$

where $\Delta_{1,m}[1]$ denotes channel variations between the channel frequency responses of the at least one even carrier of the second transmission antenna and channel frequency responses of the at least one odd carrier of the second transmission antenna, and $h_1[1,2m+1]$ and $h_1[1,2m+3]$ denote channel frequency responses of the at least one even carrier in an $1^{th}$ symbol period.

22. The system of claim 21, wherein the channel frequency responses of the at least one odd carrier of the second transmission antenna are expressed as $$h_1[1,2m] = h_1[1,2m+1] - \Delta_{1,m}[1]$$

where $h_1[1,2m]$ denotes channel frequency responses of the at least one odd carrier in an $1^{th}$ symbol period of the second transmission antenna.

23. The system of claim 16, wherein the preset period is a training period.

24. The system of claim 16, wherein the transmit diversity scheme is a space-frequency code (SFC) scheme.

25. A system for estimating a channel by a receiver in a mobile communication system comprising:
a transmitter, which includes a first transmission antenna and a second transmission antenna for transmitting signals through at least one odd carrier and at least one even carrier, for encoding symbols received for a preset reception period by a preset transmit diversity scheme, and transmitting the encoded symbols through odd carriers and even carriers of the first transmission antenna and the second transmission antenna; and
a receiver for receiving the encoded first and second symbols for the preset reception period, restoring the received encoded first and second symbols into transmission symbols by decoding the received encoded first and second symbols according to the preset transmit diversity scheme applied in the transmitter, estimating channel frequency responses of the at least one odd carrier of the first transmission antenna and channel frequency responses of the at least one odd carrier of the second transmission antennas by using channel variations between the channel frequency responses of the at least one odd carrier of the first transmission antenna and channel frequency responses of the at least one even carrier of the first transmission antenna and channel variations between channel frequency responses of the at least one even carrier of the second transmission antenna and the channel frequency responses of the at least one odd carrier of the second transmission antenna, the channel frequency responses being detected from the restored transmission symbols in a previous reception period of the preset reception period, and estimating channel frequency responses of the at least one even carrier of the first transmission antenna and channel frequency responses of the at least one even carrier of the second transmission antennas by using the channel frequency responses of the at least one odd carrier of the first transmission antenna and the channel frequency responses of the at least one odd carrier of the second transmission antenna.

26. The system of claim 25, where the receiver calculates the channel variations between the channel frequency responses of the at least one odd carrier of the first transmission antenna and the channel frequency responses of the at least one even carrier of the first transmission antenna by linear-interpolating the channel frequency responses of the at least one odd carrier of the first transmission antenna, calculates the channel variations between the channel frequency responses of the at least one odd carrier of the second transmission antenna and the channel frequency responses of the at least one even carrier of the second transmission antenna by linear-interpolating the channel frequency responses of the at least one odd carrier of the second transmission antenna, estimates the channel frequency responses of the at least one even carriers of the first transmission antenna by adding the channel variations between the channel frequency responses of the at least one odd carrier of the first transmission antenna and the channel frequency responses of the at least one even carrier of the first transmission antenna to the channel frequency responses of the at least one odd carrier of the first transmission antenna, and estimates the channel frequency responses of the at least one even carrier of the second transmission antenna by adding the channel variations between the channel frequency responses of the at least one odd carrier of the second transmission antenna and the channel frequency responses of the at least one even carrier of the second transmission antenna to the channel frequency responses of the at least one odd carrier of the second transmission antenna.

27. The system of claim 26, wherein the restored transmission symbols are expressed as $$\hat{s}_0 = \frac{h_0^* r_0 + h_1 r_1^*}{|h_0|^2 + |h_1|^2 + h_1 \Delta_1^*} + \frac{h_1^* r_0 - h_0 r_1^*}{|h_0|^2 + |h_1|^2 + h_0 \Delta_0^*} \cdot \frac{h_1 \Delta_0^*}{|h_0|^2 + |h_1|^2 + h_1 \Delta_1^*}$$

$$\hat{s}_1 = \frac{h_1^* r_0 - h_0 r_1^*}{|h_0|^2 + |h_1|^2 + h_0 \Delta_0^*} + \frac{h_0^* r_0 + h_1 r_1^*}{|h_0|^2 + |h_1|^2 + h_1 \Delta_1^*} \cdot \frac{h_0 \Delta_1^*}{|h_0|^2 + |h_1|^2 + h_0 \Delta_0^*}$$

where $\hat{s}_0$ and $\hat{s}_1$ denote restored transmission symbols, $r_0$ and $r_1$ denote reception signals of an odd $(2m^{th})$ subcarrier and an even $((2m+1)^{th})$ subcarrier of a reception antenna, $h_0$ denotes a channel frequency response of the $2m^{th}$ subcarriers of the first transmission antenna, $h_1$ denotes a channel frequency response of the $2m^{th}$ subcarrier of the second transmission antenna, $\Delta_0$ denotes a channel variation between consecutive subcarriers of the first transmission antenna, and $\Delta_1$ denotes a channel variation between consecutive subcarriers of the second transmission antenna.

28. The system of claim 27, wherein the channel frequency responses of the at least one odd carrier of the first transmission antenna and the channel frequency responses of the at least one odd carrier of the second transmission antenna are expressed as $$h_0[1, 2m] = \frac{r_0 s_0^* - r_1 s_1}{2} + \frac{-\Delta_{0,m}[1-1] + \Delta_{1,m}[1-1]s_0^* s_1}{2}$$

$$h_1[1, 2m] = \frac{r_0 s_1^* - r_1 s_0}{2} + \frac{-\Delta_{1,m}[1-1] + \Delta_{0,m}[1-1]s_1^* s_0}{2}$$

where $h_0[1,2m]$ denotes channel frequency responses of the at least one odd carrier of the first transmission antenna, $h_1[1,2m]$ denotes channel frequency responses of the at least one odd carrier of the second transmission antenna, $s_0$ and $s_1$ denote restored transmission symbols, $\Delta_{0,m}[1-1]$ denotes channel variations between channel frequency responses of the at least one odd carrier of the first transmission antenna and channel frequency responses of the at least one even carrier of the first transmission antenna, the channel frequency responses being detected in the previous reception period of the preset reception period, and $\Delta_{1,m}[1-1]$ denotes channel variations between channel frequency responses of the at least one even carrier of the second transmission antenna and channel frequency responses of the at least one odd carrier of the second transmission antenna.

29. The system of claim 25, wherein the preset reception period is a data period.

30. The system of claim 25, wherein the transmit diversity scheme is a space-frequency code (SFC) scheme.

* * * * *

UNITED STATES PATENT AND TRADEMARK OFFICE
CERTIFICATE OF CORRECTION

| | | |
|---|---|---|
| PATENT NO. | : 7,307,974 B2 | Page 1 of 1 |
| APPLICATION NO. | : 10/840584 | |
| DATED | : December 11, 2007 | |
| INVENTOR(S) | : Jong-Hyeuk Lee et al. | |

It is certified that error appears in the above-identified patent and that said Letters Patent is hereby corrected as shown below:

Title page item (73) Assignee: Samsung Electronics Co., Ltd. (KR)

should be

(73) Assignee: Samsung Electronics Co., Ltd. (KR) and Postech Foundation (KR)

Signed and Sealed this
Twenty-first Day of February, 2012

David J. Kappos
*Director of the United States Patent and Trademark Office*